Aug. 25, 1964
G. W. MASON ETAL
3,145,939
SPOOLING APPARATUS

Filed Oct. 27, 1958
5 Sheets-Sheet 1

INVENTORS
GEORGE W. MASON
BRUCE D. GEE
BY JOHN J. KACZMARCZYK

*Learman, Learman & McCulloch*

ATTORNEYS

Aug. 25, 1964  G. W. MASON ETAL  3,145,939
SPOOLING APPARATUS
Filed Oct. 27, 1958  5 Sheets-Sheet 3

INVENTORS
GEORGE W. MASON
BRUCE D. GEE
BY JOHN J. KACZMARCZYK

ATTORNEYS

Aug. 25, 1964   G. W. MASON ETAL   3,145,939
SPOOLING APPARATUS
Filed Oct. 27, 1958   5 Sheets-Sheet 5

INVENTORS
GEORGE W. MASON
BRUCE D. GEE
JOHN J. KACZMARCZYK
BY
ATTORNEYS

United States Patent Office 3,145,939
Patented Aug. 25, 1964

3,145,939
SPOOLING APPARATUS
George W. Mason and Bruce D. Gee, Otisville, and John J. Kaczmarczyk, Mount Morris, Mich.; said Kaczmarczyk assignor to said Mason
Filed Oct. 27, 1958, Ser. No. 769,810
12 Claims. (Cl. 242—35.5)

This invention pertains to apparatus for winding filamentary material such as nylon fishing lines and leaders on spools and more particularly the invention is concerned with apparatus capable of winding a predetermined length of such material on each of a number of spools and which, when set in motion, operates until the last of the spools has been wound with the selected length of material and then ceases automatically to operate.

An object of the invention is to provide spooling apparatus of improved construction capable of supporting a fairly large number of spools side by side in a row and to provide means for feeding a predetermined length of material successively to each of the spools in the row.

Another object of the invention is to provide a spooling machine of the character referred to which is automatically rendered inactive when the last spool of a row has had a selected length of material wound thereon.

A further object of the invention is to provide in a machine of the character described improved means for guiding material to a selected spool and to wind the material evenly on the spool.

Another object of the invention is to provide apparatus of simplified construction which is capable of quickly and positively transferring the feed of the filamentary material from one spool to another without breaking the material.

Another object of the invention is to provide means located in the path of material passing from its source to the spooling machine for measuring the amount of material wound on each of the spools and which is operative after the passage of a selected length of material to transfer the feeding of the material from one spool to another.

Still another object of the invention is to provide apparatus of the kind referred to which is readily adapted for use either with a single source of material or with multiple sources of material.

Other objects and advantages of the invention will be pointed out specifically or will become apparent from the following description when it is considered in conjunction with the appended claims and the accompanying drawings, in which:

FIGURE 9 is a schematic wiring diagram;

Figure 1:
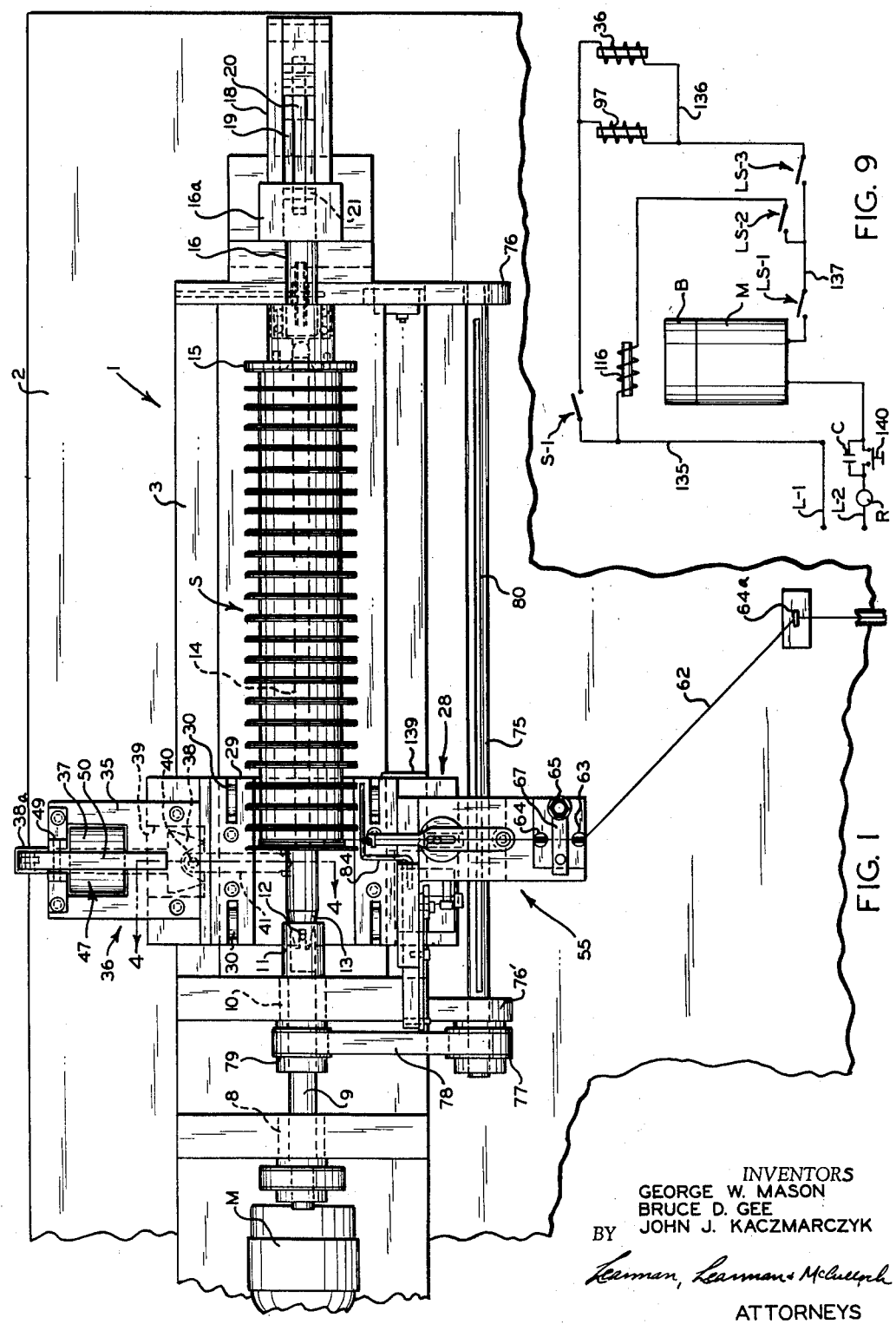
FIGURE 1 is a fragmentary, top plan view of spooling apparatus constructed in accordance with the invention and showing the apparatus in an initial stage of operation.

A spooling machine constructed in accordance with the embodiment of the invention shown in FIGURES 1–9 is represented in the drawings generally by the reference character 1 and is adapted to be supported on a platform 2, such as a table or the like. The apparatus includes a base plate 3 fixed in any suitable manner on the support 2, and the base 3 carries a pair of spaced apart, upright frame members 4 and 5, of which the member 5 is the taller. Intermediate the upper and lower ends of the frame members 4 and 5 is mounted a horizontal supporting plate 6 which is secured at its ends to the respective members 4 and 5 in any suitable manner. Adjacent to the frame member 5 is a supporting member 7 which is provided near its upper end with an opening surrounded by a bearing 8 and in which is rotatably journaled a shaft 9 which also is journaled in a corresponding opening surrounded by a bearing 10 provided in the frame member 5. Fixed to the end of the shaft 9 which projects towards the frame element 4 is a socket member 11 in which is mounted a transversely extending pin 12, the socket 11 being adapted to receive a nose piece 13 having a bifurcated end adapted to straddle the pin 12. The nose piece 13 is rigidly connected to a rod 14 on which a plurality of spools S are adapted to be mounted side by side to form a row. The other end of the rod 14 is adapted to extend to a point adjacent to the frame member 4 and be received in an opening formed in a presser disc 15 mounted for rotation at one end of a shift 16 which is slideably journaled in a bearing support 16a mounted on a bracket 17 fixed to the frame element 4. The bearing support 16a includes a hollow extension 18 into which the shaft 16 extends, the shaft being slotted for a portion of its length as at 19 for reception of a link 20 which is connected to the shaft 19 by means of a pin 21. Also pivoted to the link 20 by means of a pin 22 is one end of an operating lever 23, the arrangement being such that swinging movement of the lever 23 causes movement of the shaft 16 and its associated parts towards or away from the socket member 11.

The frame elements 4, 5, 7, and the parts supported thereby constitute means for supporting the plurality of spools S for rotation. Means for rotating the spools comprises an electric motor M mounted on the base plate 3. The armature shaft 24 of the motor has a pulley 25 fixed thereto, around which is trained a driving belt 26, the latter also being trained around a pulley 27 keyed or otherwise suitably fixed to the shaft 9.

Mounted on the horizontal frame piece 6 for sliding movements to and fro and parallel to the spool supporting rod 14 is a carriage assembly 28. The carriage assembly includes a horizontal supporting plate 29 (see particularly FIGURE 3) provided with a plurality of rollers 30 which bear against the upper surface of the frame piece 6 so as to facilitate to and fro movements of the carriage assembly. Parallel to the supporting plate 29, but below the level of the frame piece 6, is a mounting plate 31 having a slot 32 therein in which is received a longitudinally extending comb-like member rigidly secured to the lower surface of the frame piece 6 and comprising a rod or strip 33 having a number of uniformly spaced pins 34 secured thereto and projecting rearwardly of the apparatus.

The mounting plate 31 includes a rearwardly extending projection 35 on which is mounted an indexing mechanism 36 including a solenoid having a winding 37 within which is a reciprocable plunger 38. The plunger 38 extends into a notch 39 formed in the mounting plate 31 and has connected thereto by means of a pin 40 one end of a locking pin 41. The pin 41 is slideably received in a passage 42 formed in the mounting plate 31, the passage being in communication with the notch 39, and the forward end 43 of the pin is so shaped as to be received between any pair of adjacent pins 34 and lock the carriage assembly 28 against sliding movements relative to the frame piece 6.

Figure 5:
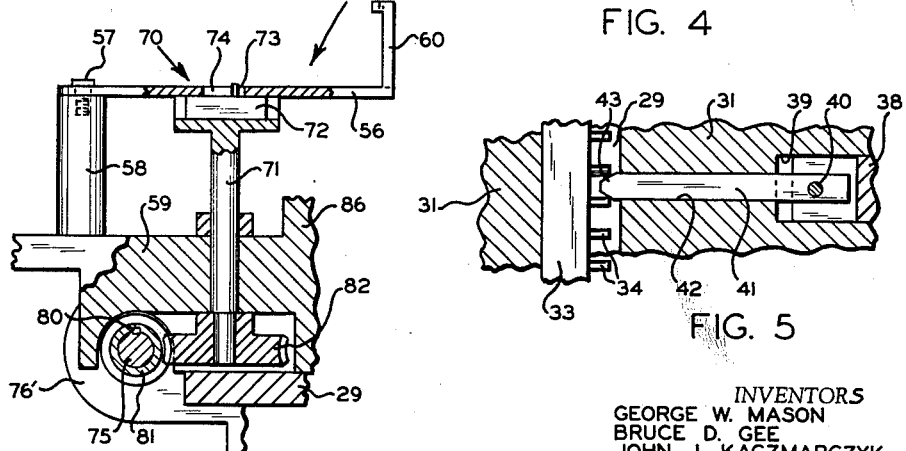
FIGURE 5 is a sectional view taken on the line 5—5 of FIGURE 4.

The locking pin 41 normally is urged to its projected position, i.e., the position shown in FIGURE 5, by means of a tension spring 44 having one of its ends connected to the pin 40, and its other end connected to an anchor pin 45 secured to the mounting plate 31. The construction of the solenoid therefore, should be such that energization of the solenoid will cause movement of the plunger 38 and the locking pin 41 rearwardly, so as to withdraw the nose 43 of the pin from between the teeth 34. In order to permit manual operation of the locking pin 41, the solenoid plunger 38 includes a rearward extension 38a having a slot therein for reception of one arm 46 of a two-armed operating lever 47, which is pivoted as at 48 to an upstanding bracket 49 mounted on the plate 31. The second arm 50 of the lever 47 serves as an operating handle to facilitate manual operation of the locking pin 41.

The construction and arrangement of the parts of the carriage assembly described thus far are such that the carriage assembly 28 normally is disabled by the interaction of the pin 41 and the teeth 34 from movements to and fro along the frame piece 6. The carriage assembly, however, is constantly biased to move in a direction from one end of the row of spools S to the other by means of a cable 51 (see FIGURE 2) connected at one of its ends to a post 52 secured to the mounting plate 31 and connected at its other end to a weight W which preferably is located below the level of the support member 2 so as to be located in a region which will not interfere with operations around the apparatus. In order to permit the weight W to be so located, the support 2 may have an opening 53 therein through which the cable 51 passes, and to avoid undue wear of the cable 51, the latter may be trained around a pulley 54 mounted on the frame member 4. The arrangement of the weight W and its associated parts is such that retraction of the locking pin 41 from between a pair of adjacent pins 34 enables the carriage member 28 to be moved from left to right, as viewed in FIGURES 1 and 2. The distance the carriage member moves depends upon the length of time the locking pin 41 is clear of the pins 34. Preferably, the carriage member 28 moves in increments of distance corresponding to the spacing between adjacent spools S on the spool supporting rod 14. Accordingly, the spacing of the stop pins 34 should correspond to the spacing of the spools S. Thus, for each actuation of the indexing mechanism 36, the carriage member 28 is moved a distance corresponding to the spacing of adjacent spools S.

Since the carriage member 28 moves transversely of the row of spools on which material is to be wound, means for guiding material successively to each of the spools is provided. The guide means 55 includes an arm 56 pivoted at one of its ends, by means of a pin 57, to a post 58 supported on a forwardly projecting block 59 fixed to the supporting plate 29. At the other end of the arm 56 is an upstanding guide part or finger 60 which is slit from top to bottom as at 61 (see FIGURE 2) to accommodate a strand 62 of filamentary material such as nylon leader extending from a reel or drum (not shown in FIGURES 1-8) to the row of spools S. Also forming part of the guide means 55 is a pair of slotted guide fingers 63 and 64 fixed at the upper end of a post 65 in such manner that their slots are aligned and face the guide element 60. The lower end of the post 65 is fixed in any suitable manner to the mounting part 59 and has its upper end reduced as at 66 to receive a slideable presser plate 67 which is adapted to ride upon the strand 62 and maintain the latter in the guide fingers 63 and 64. If desired, the reduced end 66 of the post 65 may receive a light compression spring 68 which reacts between an adjustable nut 69 and the presser plate 67 to urge the latter against the strand 62.

It is preferred that the strand 62 of material be fed to the guide means 55 from a point which is located substantially at the center of the row of spools S. This can be achieved by mounting a guide ring 64a on the support 2 and threading the strand 62 therethrough.

The arrangement of the parts thus far described is such that the leading end of the strand 62 may be fixed to a selected spool S where upon rotation of the spool supporting shaft will cause the strand of material to be guided to the particular spool and wound around the latter. During the winding of a length of material on any given spool, it is preferred that the strand be so guided that it moves back and forth between the spool rims so as to distribute the material uniformly between the spool rims. Accordingly, apparatus constructed in accordance with the invention includes a level wind device 70 (see FIGURE 6) comprising a spindle 71 journaled in the support 59 for rotation about a vertical axis and having fixed at its upper end a disc 72 on which is mounted an eccentric crank pin 73 arranged to project through a slot 74 formed in the guide arm 56. The arrangement is such that rotation of the spindle 71 and the disc 72 will cause oscillation of the guide arm 56. The eccentricity of the pin 73 is so selected that the sweep of the arm 56 corresponds substantially to the distance between the rims of any of the spools S.

Figure 2:
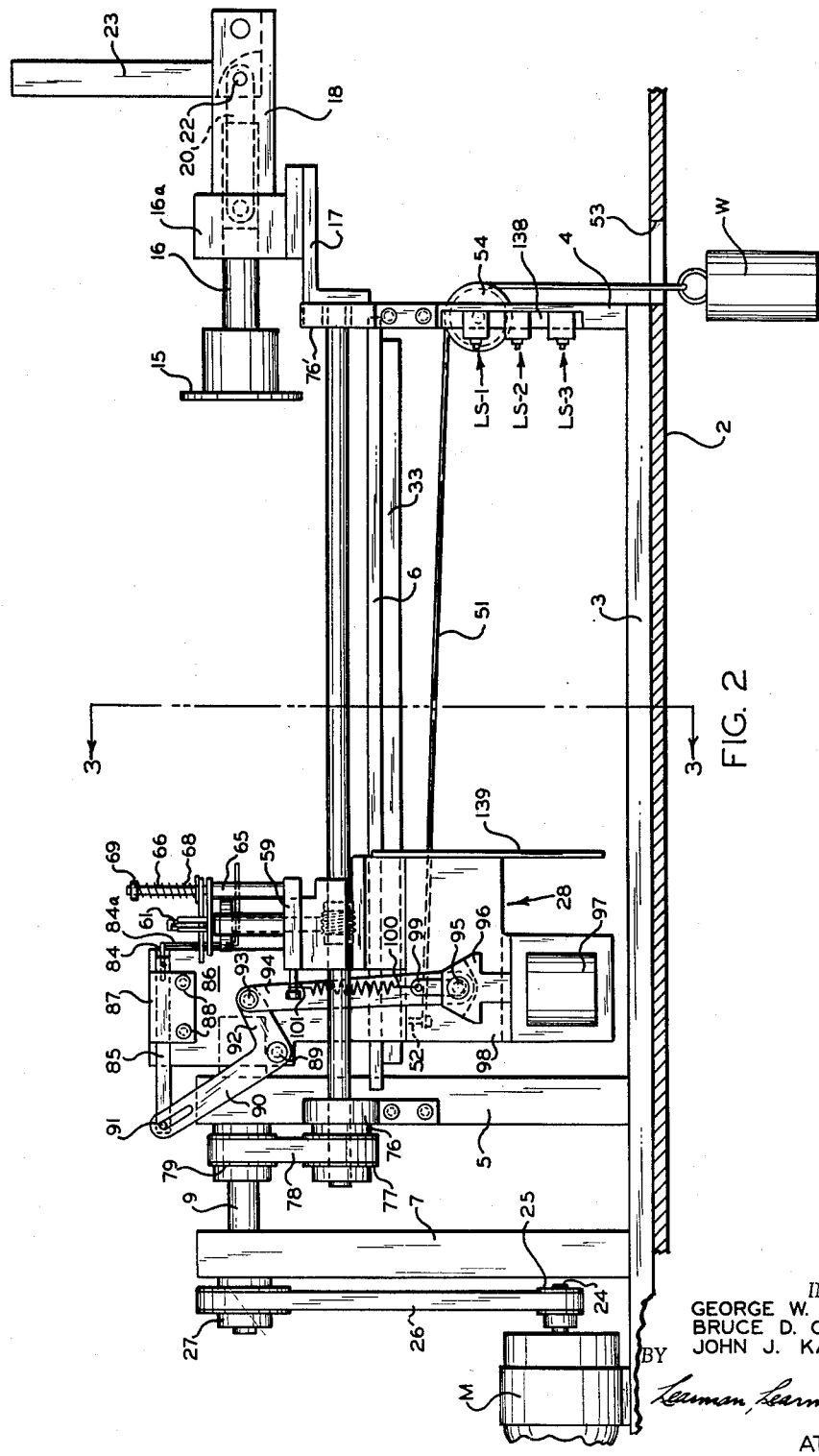
FIGURE 2 is a fragmentary view partly in front elevation and partly in section, of the apparatus shown in FIGURE 1.
Figure 3:
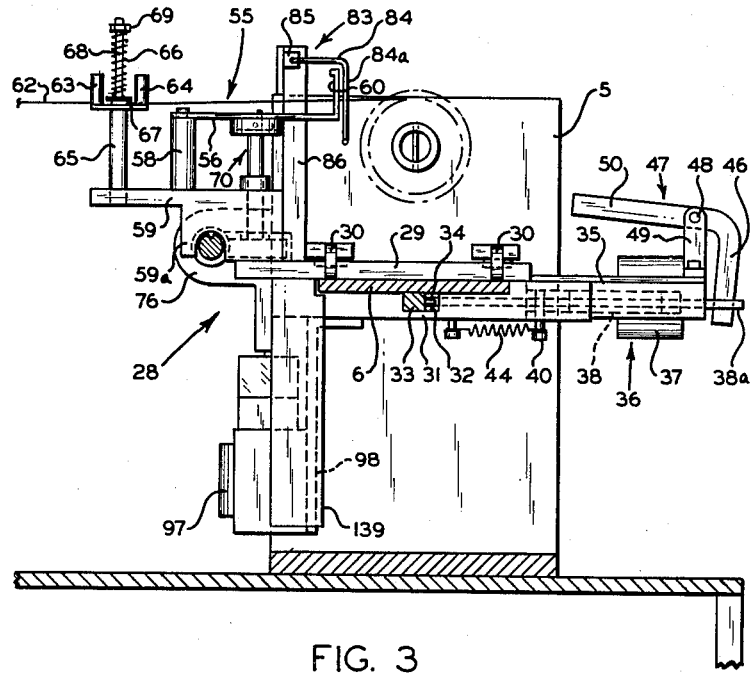
FIGURE 3 is a sectional view taken on the line 3—3 of FIGURE 2.
Figure 4:
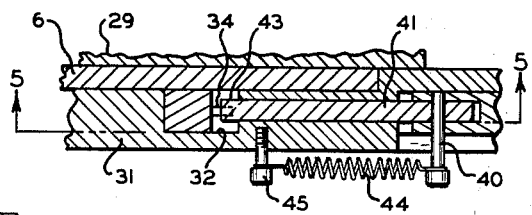
FIGURE 4 is an enlarged, sectional view of a detail of the apparatus shown in FIGURE 3.
Figure 6:
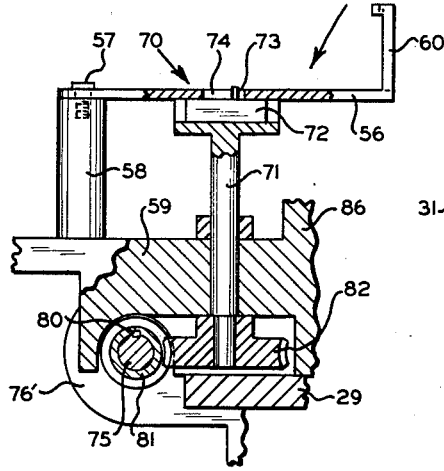
FIGURE 6 is an enlarged, sectional view of another portion of the apparatus shown in FIGURE 3.

Means for rotating the spindle 71 comprises a shaft 75 journaled in similar bearing supports 76 and 76′ fixed to the frame members 4 and 5, respectively, and arranged to project forwardly of the apparatus. The shaft extends beyond the bearing support 76′ and is fitted with a pulley 77 around which is trained a belt 78, the latter also being trained around and driven by a pulley 79 fixed on the shaft 9, as is best shown in FIGURES 1 and 2. The shaft 75 is provided with a longitudinally extending spline tooth 80 and slideably receives a worm 81 having a keyway which receives the tooth 80, thereby enabling the shaft 80 to effect rotation of the worm 81. The worm is located between a pair of spaced, depending flanges 59a forming part of the support 59 and thus is so positioned as always to be in mesh with the teeth of a worm gear 82 fixed at the lower end of the spindle 71. The arrangement is such that rotation of the spool supporting shaft 14 by the drive shaft 9 causes rotation of the shaft 75 and the worm 81 and, consequently, rotation of the gear 82 and the spindle 71 and oscillation of the arm 56.

Apparatus constructed in accordance with the invention is intended to wind a selected length of material on one spool, then wind a selected length of material on another spool, and so on until each of the spools in a row has been supplied with material. The operation is intended to proceed from start to finish without necessitating the cutting of the strand 62 and without interruption. Accordingly, mechanism must be provided for deflecting the strand of material from a completely wound spool to the next adjacent spool at the time the selected length of material has been wound on the immediately preceding spool.

The invention includes deflecting mechanism designated generally by the reference character 83 and comprising a deflector arm 84 positioned between the spools S and the guide finger 60, and having a vertical portion 84a which extends adjacent to a strand 62 spanning the distance between the guide finger 60 and a spool S. One end of the arm 84 is rigidly connected to a slide 85 (see FIGURES 2 and 3) which is mounted for reciprocating movements in a groove formed adjacent to the upper end of an upright member 86 which is rigidly supported by the plate 29. The slide is retained in the groove in the support 86 by means of a keeper plate 87 secured to the plate 86 by means of screws 88. The normal or inactive positions of the slide 85 and the arm 84 are as indicated in FIGURES 1 and 2. When the slide 85 is actuated to move from left to right, however, the vertical portion 84a of the arm will engage the strand 62 and deflect it to the next adjacent spool S.

Means for actuating the deflector mechanism comprises a bell crank lever pivotally mounted as at 89 on the support 86 and including an arm 90 having a pin and slot connection 91 to the free end of the slide 85. The other arm 92 of the bell crank is pivotally connected by means of a pin 93 to one end of a link 94, the other end of which is pivoted as at 95 to the armature 96 of a solenoid 97. The solenoid is supported on a depending flange 98 secured to the supporting member 31. Also connected to the pivot pin 95 is an upwardly projecting ear 99 to which is connected one end of a biasing spring 100, the other end of which is anchored to a pin 101 fixed to the support part 59. The spring 100 exerts a force on the solenoid armature 96 tending to raise the latter, but is sufficiently yieldable to enable the armature 96 to descend when the solenoid is actuated so as to permit the bell crank to shift the slide 85 and actuate the deflector arm 84 to jump or deflect the strand 62 from one spool to the next adjacent spool.

One of the objects of the invention is to assure the winding on each of the spools S of a predetermined length of material. To accomplish this objective, the invention includes measuring means designated generally by the reference character 105 for measuring the length of material supplied to each of the spools.

Figure 7:
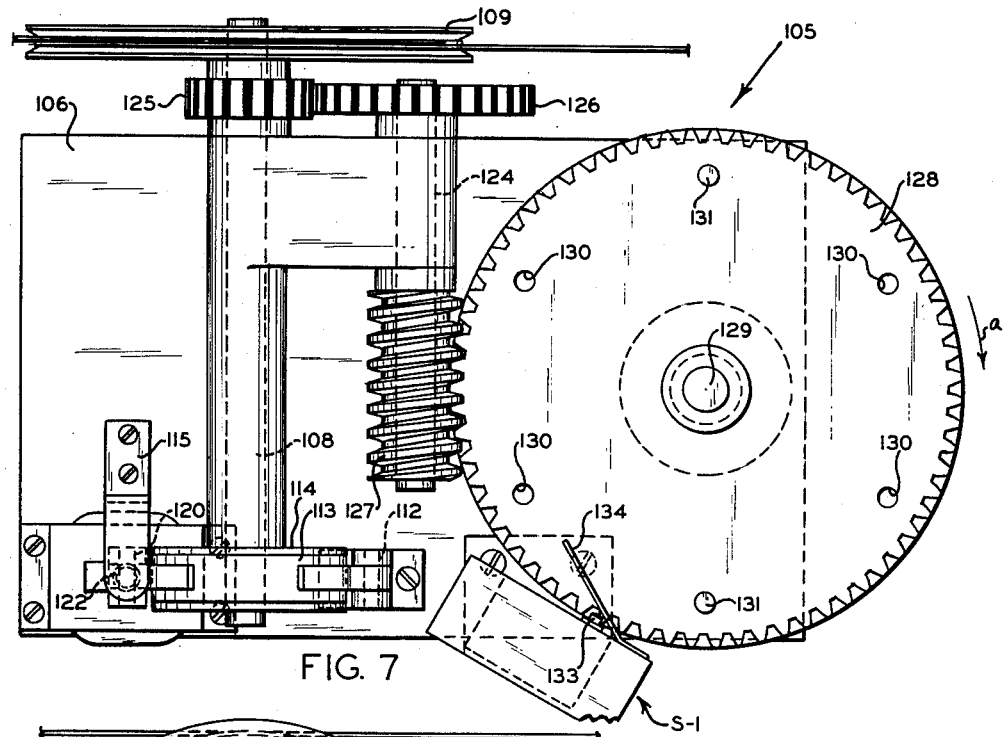
FIGURE 7 is a top plan view of a measuring device forming a part of the apparatus.
Figure 8:
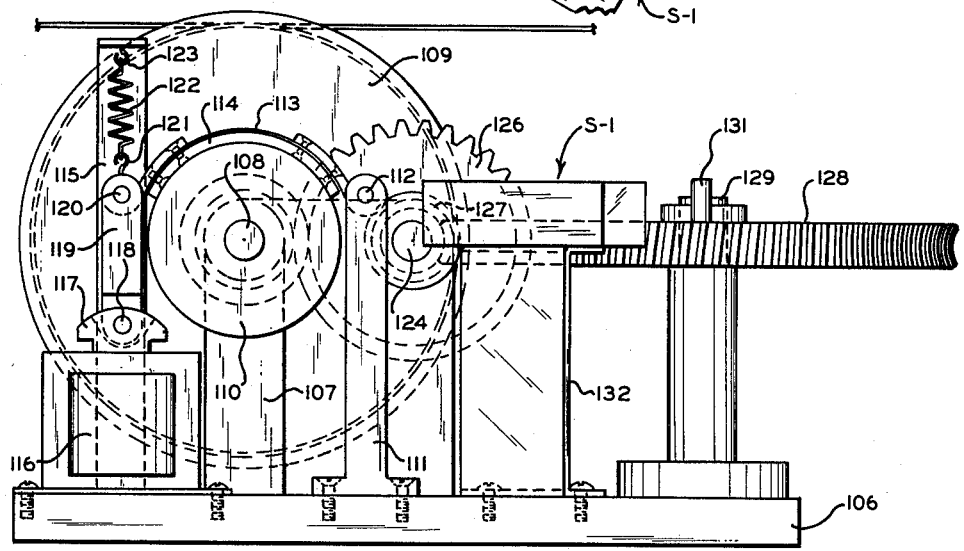
FIGURE 8 is a side elevational view of the device shown in FIGURE 7.

The measuring apparatus is best disclosed in FIGURES 7 and 8 and comprises a base 106 on which the parts are mounted. The base 106, may, if desired be located on the support 2; but in any event, the measuring apparatus must be located between the source of supply of the material to be wound and the guide mechanism 55. Mounted on the base 106 is a journal block 107 in which is journaled a shaft 108. One end of the shaft 108 projects beyond the base 106 and has fixed thereto a grooved wheel 109 about which more will be said subsequently. The other end of the shaft 108 has keyed or otherwise fixed thereto a brake drum 110 which rotates with the wheel 109. Adjacent to the brake drum 110 the base is provided with a supporting standard 111 at the upper end of which is pivotally mounted, as at 112, one end of a brake shoe 113 to which is riveted or otherwise suitably secured brake lining material 114. The base also is provided with another supporting standard 115 adjacent to the brake drum 110 and on which is mounted a solenoid winding 116, in which is reciprocably mounted an armature 117 that is pivoted as at 118 to one end of a link 119. The other end of the link 119 is pivoted as at 120 to the other end of the brake shoe 113 and carries a hook 121 to which is connected one end of a tension spring 122. The other end of the spring 122 is fastened to a similar hook 123 which is supported by the standard 115. The arrangement is such that the wheel 109 and the brake drum 110 normally are freely rotatable, but are capable of being braked rapidly to a stop by energization of the solenoid winding 116.

The journal block 107 also journals a jack shaft 124 which parallels the shaft 108 and is driven by engagement between a pinion 125 fixed to the shaft 108 and a gear 126 fixed to the shaft 124. Also fixed to the shaft 124 is a worm 127 which meshes with the teeth of a worm gear 128 mounted for rotation about a vertical axis on a shaft 129 mounted on the base 106. Adjacent to the periphery of the gear 128 is located a plurality of holes or openings 130 in any of which a pin 131 is adapted removably to be located. On a bracket 132 adjacent to the gear 128 is mounted a normally open switch S–1 having a fixed contact 133 adapted to be engaged by a movable blade 134 which is so mounted as to be engaged by each of the pins 131 carried by the gear 128.

Referring now to FIGURE 9, a control circuit for the apparatus includes a pair of power lines L–1 and L–2 adapted for connection to a source of electric energy such as 110 volt A.C. To the line L–1 is connected a wire 135 which leads to the switch S–1 and then is connected to one terminal of the deflector mechanism solenoid 97 and to one terminal of the indexing solenoid 36. The other terminals of the solenoids 97 and 36 are connected by a wire 136, the arrangement being such that the two solenoids are connected in parallel. In the line L–2 is located a starting relay R having a normally open contact c, and a starting switch 140. The relay and the switch 140 are so connected that closing of the switch energizes the relay and cause the contact c to close and remain closed until power to the motor is shut off.

The power line L–2 is connected to one terminal of the motor M, the latter having a solenoid operated brake mechanism B of known construction, which is operable to stop the motor immediately the current thereto is broken. From the other terminal of the motor extends a wire 137 which is connected to the wire 136. As is shown in FIGURE 9, three normally closed switches, LS–1, LS–2 and LS–3, are incorporated in the circuit. The switch LS–1 is located in the line 137; the switch LS–2 is connected to the brake solenoid 116 which acts on the wheel 109; and the switch LS–3 is connected in the line 137 leading to the solenoids 36 and 97. The switches LS–1, LS–2 and LS–3 are mounted on a bracket 138 fixed to the frame member 4 in the path of travel of the carriage assembly 28 and each switch is adapted to be actuated or opened simultaneously by an actuating bar 139 which is secured to the bracket 98 on the carriage.

To condition the apparatus thus far described for operation, the spool supporting rod 14 provided with a plurality of spools S is mounted between the shafts 9 and 15 and clamped therebetween, so as to be rotated upon actuation of the motor M. A strand 62 of filamentary material such a nylon leader is wound around the wheel 109 of the measuring apparatus 105 and then is passed through the several guide loops and fingers of the guiding apparatus. The leading end of the strand 62 then is secured to a selected one of the spools S, or to a clip (not shown) mounted on the nose piece 13, so that rotation of the spools S will cause the strand of material to be fed to the spool. Due to the fact that the strand of material is wound around the wheel 109, the latter and its associated parts of the measuring apparatus will be rotated as the material is fed to the spools.

In the embodiment of the invention shown in FIGURES 1–9, the winding of the spools S commences at the left hand end of the row of spools and progresses toward the other end. In order to position the carriage assembly 28 at the left hand end of the row of spools, the manual operating lever 50 of the indexing apparatus 47 may be operated so as to disengage the locking pin 41 from the teeth 34, whereupon the carriage assembly is shiftable to its starting position.

When the carriage assembly has been shifted to a starting position, the starting switch 140 may be closed to supply electrical energy to the motor M, whereupon the winding of material on the first spool will commence. As has been pointed out, winding of the material on the spool will cause rotation of the wheel 109 and, consequently will cause corresponding rotation of the gear 128. In this connection, the manner in which the strand of material is wrapped around the wheel 109 should be such that the gear 128 is rotated in the direction of the arrow a in FIGURE 7.

The diameter of the wheel 109, the diameter of the gear 128, and the ratios between the gears 125, 126 and 127, 128 should be so selected that for each revolution of the wheel 109, the gear 128 will have been rotated through a predetermined number of radians which may be so related to the number of teeth on the gear 128 that each tooth on the gear represents a unit of length of the strand 62 which will be wound on the spool S. One convenient relationship among the elements of the measuring apparatus would be the provision of a wheel 109 having a one foot diameter and having a three to one speed ratio to the shaft 124. The gears 127 and 128 then may be so constructed that each tooth on the gear 128 represents one yard of material passing the measuring apparatus 105. With such an arrangement, the number of teeth between the openings 130 in the gear 128 would represent the number of yards of material which would be wound on a spool S during rotation of the gear 128, an amount corresponding to the angle between a pair of adjacent openings 130. Thus, if it is desired to wind fifty yards of material on each of the spools S, a pair of pins 131 may be mounted on the gear 128 a distance apart corresponding to the spacing between fifty gear teeth. In such an arrangement, the gear 128 preferably would have one hundred teeth so that no odd number of teeth would be left over after a pair of pins have been inserted in the gear.

With apparatus constructed in accordance with the foregoing example, winding operations would begin with one of the pins 131 just releasing the arm 134 of the switch S–1, and the winding of the particular spool would continue until the other pin 131 engaged the arm 134 and closed the switch S–1. At this point, the solenoid 36 would be momentarily energized so as to withdraw the locking pin 41 from between two adjacent stop pins 34 and enable the weight W to move the carriage assembly 28 one space to the right, as viewed in FIGURE 1; or, in other words, to a position in which the guide mechanism is opposite the second spool S in the row of spools. Simultaneously, the solenoid 97 will be momentarily energized so as to actuate the deflector arm 84 and jump or deflect the strand of material from the first spool to the second spool in the row.

Operation of the apparatus in the manner described will continue until each of the spools S has a length of material wound thereon and the length of the material will depend on the setting of the pins 131 on the counter gear 128 of the measuring apparatus 105. When the last spool of the row has been wound with the material, the switch S–1 again will be closed by one of the pins 131 so as to enable the carriage assembly 128 to be shifted slightly to the right, as viewed in FIGURES 1–2. The distance the carriage assembly moves to the right after the last spool on the row has been wound is only an amount sufficient to enable the stop bar 139 to engage and operate the switches LS–1, LS–2, and LS–3. Closing of the switch LS–3 breaks the circuit to the solenoids 36 and 97, thereby rendering them ineffective to index the carriage assembly or deflect the strand of material. Opening of the switch LS–2 breaks the circuit to the solenoid 116, whereupon the brake drum 100 is braked to a stop so that unneeded material is not withdrawn by the wheel 109 from the source of material. Opening of the switch LS–1 breaks the circuit to the motor M, whereupon the brake B is effective to stop rotation of the shaft 9 and, consequently, to stop rotation of the spools S. The breaking of the circuit to the motor M also de-energizes the relay R so that the apparatus may not be started again until the start switch 140 is closed.

When the apparatus has been brought to a standstill after completion of the winding of the last spool on the row of spools, the strand of material leading to the last row of spools may be cut. Thereafter, the lever 23 may be actuated to permit removal of the rod 14 and the spools S from between the shafts 9 and 16.

In a typical operation, each of the spools S will have fifty yards of leader material wound thereon, and the material wound on one spool will be connected to the material wound on each of the other spools. Under these circumstances, the strand of material extending from one spool to another either may be cut so as to provide a plurality of spools each of which has fifty yards of material wound thereon; or a selected number of spools may be permitted to remain interconnected by the material and thereby provide a number of spools containing a continuous length of material totaling 100, 150, 200 or more yards of material.

Figure 10:
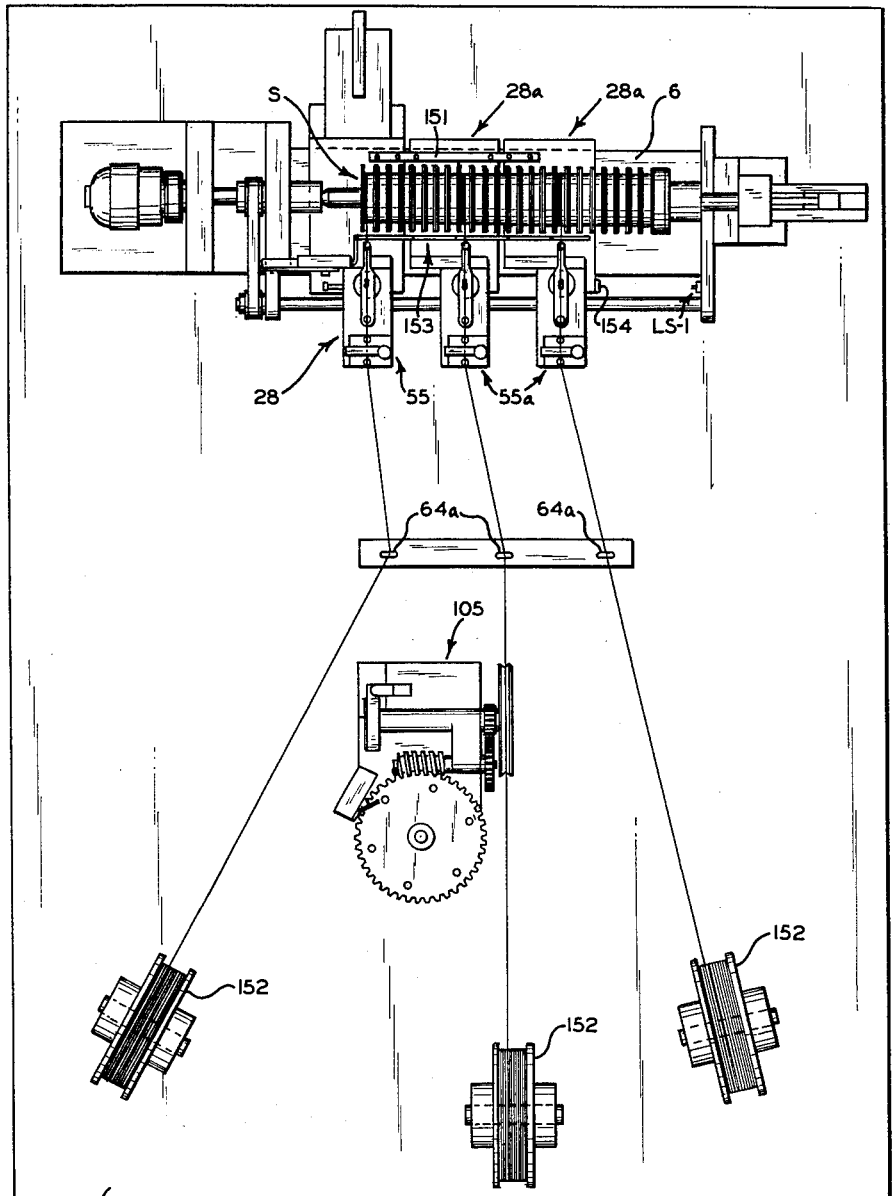
FIGURE 10 is a top plan view showing apparatus similar to the apparatus shown in FIGURE 1, but modified for use in conjunction with multiple sources of supply.

The embodiment of the invention shown in FIGURE 10 is quite similar to the apparatus previously disclosed and illustrates the manner in which the invention may be adapted for use with multiple sources of supply. In the embodiment shown in FIGURE 10 there is a carriage assembly 28 identical in construction and operation to the carriage assembly 28 previously disclosed. Adjacent to the assembly 28 is one or more similar assemblies 28a which also are mounted for sliding movements on the frame piece 6 and are connected to one another and to the carriage assembly 28 by means of spacer bars 151 which may be secured to the members 28 and 28a in any suitable manner. On each of the assemblies 28a is mounted guide apparatus 55a similar in all respects to the guide apparatus 55. To and through each of the guides 55 and 55a extends the leading end of a strand of material leading from a separate reel or drum 152 mounted on the support 2 for rotation in such manner as to feed the material to the row of spools S upon rotation of the latter.

When using apparatus of the kind disclosed in FIGURE 10, it is important that the number of spools S be evenly divisible by the number of guide mechanisms used and that the spacing between each guide mechanism corresponds to the number of spools which may be divided evenly by the number of guide mechanisms. In the disclosed embodiment there are 24 spools in the row and there are 3 guide mechanisms. Accordingly, the spacing between each adjacent pair of guide mechanisms should correspond to the width of 8 spools.

Figure 11:
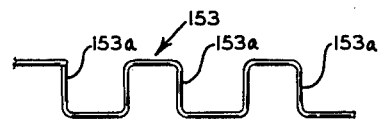
FIGURE 11 is an enlarged view showing a detail of the FIGURE 10 construction.

When utilizing a gang of guide mechanisms, only minor modification must be made of apparatus like that shown in FIGURES 1–8. One modification is the substitution for the deflector arm 84 of a deflector arm 153 of such length as to be capable of acting on each of the strands 62 when it is operated by the deflecting mechanism previously described. An arm 153 such as would be used with the apparatus shown in FIGURE 10 is illustrated in FIGURE 11 as including a plurality of vertical portions 153a, each of which operates in exactly the same manner as the vertical portion 84a of the arm 84.

Another small modification which must be made in order to permit the use of gang guide mechanisms is to mount an actuating bar 154, similar to the bar 139, on the assembly 28a which is closest to the bank of switches LS–1, LS–2, and LS–3, so as to actuate the latter when the row of spools has been wound.

It is to be noted that the use of gang guiding mechanisms does not necessarily require the provision of multiple measuring devices. In fact, a single measuring device 105 is capable of being used irrespective of the number of guide mechanisms which may be associated with the spooling apparatus. Accordingly, no additional switches, solenoids, or other electrical devices are required in the embodiment shown in FIGURE 10. However, the number of spools wound in a given time by the machine shown in FIGURE 10 would be three times the number of spools wound in the same time by the machine shown in FIGURE 1, assuming the number of spools in a row in each instance to be the same. This is because three spools in the FIGURE 10 machine are being wound simultaneously, whereas only one spool is being wound at any given time with the FIGURE 1 machine.

What is claimed is:

1. Apparatus for winding a length of filamentary material from a source of said material on each of a plurality of spools, said apparatus comprising means for supporting a plurality of spools side by side in a row; means for rotating said spool supporting means; a carriage; means mounting said carriage for movements along said row in a direction from one end to the other; guide means interposed between said spool supporting means and said source to guide material from said source to a selected one of said spools; means connected to said carriage for indexing the latter along said row in increments of distance corresponding to the distance between adjacent spools; means interposed between said source and said guide means for measuring the length of material drawn from said source; means interconnecting said measuring means and said indexing means operable in response to the passage of a predetermined length of material past said measuring means to effect incremental movement of said carriage in said direction; deflector means mounted on said carriage adjacent said spool supporting means and having a part engageable with material passing to said selected one of said spools to deflect said material in the direction of movement of said carriage; and means interconnecting said measuring means and said deflector means for operating the latter in response to the passage of said predetermined length of material past said measuring means.

2. Apparatus as set forth in claim 1 including means located in the path of movement of said carriage and engageable by the latter when said carriage reaches said other end of said row to disable said means for rotating said spool supporting means.

3. Apparatus as set forth in claim 1 including means located in the path of movement of said carriage and engageable by the latter when said carriage reaches said other end of said row to disable said indexing means.

4. Apparatus as set forth in claim 1 wherein the first mentioned interconnecting means comprises a switch actuated electrical impulse device and a rotatable element having a selected number of removable switch engaging parts mounted thereon for actuating said device a corresponding number of times per revolution of said element.

5. Apparatus for winding a length of filamentary material from a source of said material on each of a plurality of spools, said apparatus comprising means for supporting a plurality of spools side by side in a row; means for rotating said spool supporting means; a carriage; means supporting said carriage for movements along said row; means connected to said carriage and urging the latter to move along said row in a direction towards one end of the latter; indexing mechanism associated with said carriage and normally restraining movement of said carriage; means operatively connected to said indexing mechanism for intermittently disabling the latter whereby said biasing means is enabled to move said carriage incrementally towards said one end of said row; means for operating said disabling means; a deflector device mounted on said carriage for movement with the latter, said deflector device having a part engageable with material passing to one of said spools to deflect said material in the direction of movement of said carriage; and means connected to said deflector device for intermittently operating said part in timed relation to the disabling of said indexing mechanism.

6. Apparatus as set forth in claim 5 including stop means located in the path of movement of said carriage when the latter reaches said one end of said row and connected to said disabling means for rendering the latter inactive.

7. Apparatus as set forth in claim 5 including stop means located in the path of movement of said carriage when the latter reaches said one end of said row and connected to said deflector device for rendering said part inactive.

8. Apparatus as set forth in claim 5 including measuring means interposed between said source and said spool supporting means for measuring the amount of material supplied to the latter.

9. Apparatus for winding a length of material on each of a plurality of spools, said apparatus comprising a number of sources of supply of said material; a support member for supporting a plurality of spools side by side in a row, said support member being capable of supporting a quantity of spools which is evenly divisible by the number of sources of supply; a carriage member; means mounting one of said members for movement relative to the other in a direction parallel to said row; a number of guide means supported on said carriage member and corresponding to the number of sources of supply, said guide means being equally spaced from one another a distance corresponding to the number of spools determined by dividing the plurality of spools by the number of sources of supply; means connected to the movable one of said members for indexing the latter along said row in increments of distance corresponding to the distance between adjacent spools; means associated with material leading from one source of supply for measuring the length of material drawn from said one source; and means interconnecting said measuring means and said indexing means operable in response to the withdrawal of a predetermined length of material from said one source to effect operation of said indexing means.

10. The apparatus set forth in claim 9 including a deflector device mounted on said carriage member, said deflector device having a part engageable with material passing each of said guide means to deflect material from each source from one spool to the next adjacent spool; and means interconnecting said measuring means and said deflector device for intermittently operating each of said parts simultaneously in timed relation to the operation of said indexing means.

11. Apparatus for measuring the length of filamentary material drawn from a source of said material, said apparatus comprising a rotatable member of a selected diameter having its axis of rotation normal to the longitudinal axis of said material so as to enable said material to be trained about the periphery of said member; a rotatable element having a diameter selected with reference to the diameter of said member so as to have a predetermined ratio thereto, said element having a number of circumferentially spaced apart sockets therein; motion transmission means interconnecting said element and said member so that rotation of the latter causes rotation of said element, said transmission means being effective to rotate said element at said predetermined ratio to the rotation of said member; mechanism to be operated in response to rotation of said element; and actuating means connected to said mechanism for actuating the latter upon rotation of said element, said actuating mechanism comprising a selected number of first parts removably mounted in selected sockets of said rotatable element, and a second part engageable by each of said first parts during rotation of said element, the number and spacing of said first parts determining the number of times per revolution of said rotatable element that said mechanism is actuated.

12. In a machine for winding a measured length of material on each of a number of adjacent spools mounted in a row, said machine having means for measuring the length of material passing from a source of said material to each of said spools: the combination of deflecting means having a part engageable with material passing to said spools; carriage means mounting said deflecting means adjacent said row of spools and for movement along said row in increments of distance corresponding to the distance between adjacent spools; operating means acting on said carriage means for moving the latter incrementally; an actuating means independent of said operating means operable in response to the passage of a predetermined length of material to each of said spools for moving said deflecting means incrementally along said row to deflect material from one spool to the next adjacent spool.

References Cited in the file of this patent

UNITED STATES PATENTS

| | | |
|---|---|---|
| 2,122,468 | Hill | July 5, 1938 |
| 2,460,723 | Weesner | Feb. 1, 1949 |
| 2,597,375 | Rinehart | May 20, 1952 |
| 2,815,905 | Birchler et al. | Dec. 10, 1957 |